United States Patent

Otsuka et al.

[11] Patent Number: 5,126,863
[45] Date of Patent: Jun. 30, 1992

[54] LIQUID CRYSTAL PROJECTION DISPLAY APPARATUS HAVING TWO MICROLENS ARRAYS

[75] Inventors: Akira Otsuka, Amagasaki; Shin-Ichiro Ishihara, Takatsuki; Yoshito Miyatake, Neyagawa; Sadayoshi Hotta, Hirakata, all of Japan

[73] Assignee: Matsushita Electric Industrial Co., Ltd., Osaka, Japan

[21] Appl. No.: 600,986

[22] Filed: Oct. 23, 1990

[30] Foreign Application Priority Data

Oct. 26, 1989 [JP] Japan ............... 1-280549

[51] Int. Cl.⁵ .............. G02F 1/1335; G02F 1/1333
[52] U.S. Cl. ................................. 359/41; 359/83
[58] Field of Search ........... 350/334, 331 R, 114; 359/40 US, 41 US, 83 US, 49 US

[56] References Cited

U.S. PATENT DOCUMENTS

| 4,722,593 | 2/1988 | Shimazaki | 350/336 |
| 4,790,632 | 12/1988 | Miyakawa et al. | 350/347 V |
| 4,836,652 | 6/1989 | Oishi et al. | 350/334 |
| 4,909,601 | 3/1990 | Yajima et al. | 350/331 R |
| 4,917,464 | 4/1990 | Conner | 350/335 |
| 5,052,783 | 10/1991 | Hamada | 359/40 |

FOREIGN PATENT DOCUMENTS

| 1-189685 | 1/1988 | Japan . |
| 1187502 | 7/1989 | Japan . |
| 2001816 | 1/1990 | Japan . |

Primary Examiner—John S. Heyman
Assistant Examiner—Ron Trice
Attorney, Agent, or Firm—Wenderoth, Lind & Ponack

[57] ABSTRACT

In a liquid crystal projection display apparatus, light is emitted from a light source and is separated and directed to pixels of a liquid crystal display element and condensed at the center of each pixel with a first microlens array. The light which has passed through the liquid crystal display element is converted into approximately parallel rays with a second microlens array. The light which has passed through the second microlens array is projected onto a screen via a projection lens.

2 Claims, 3 Drawing Sheets

LIQUID CRYSTAL PROJECTION DISPLAY APPARATUS HAVING TWO MICROLENS ARRAYS

BACKGROUND OF THE INVENTION

1. Field of the Invention

The present invention relates to a liquid crystal projection display apparatus for casting an optical image formed on a liquid crystal display element by illumination light and projecting it on a screen by a projection lens to obtain a projector image.

2. Description of the prior Art

There is known a liquid crystal projection display apparatus which is designed to place a microlens array in front of a liquid crystal display element on which an optical image is formed, converge the illumination light by a microlens to cast a corresponding pixel, and project it on a screen by enlargement with a projection lens (see Japanese Laid-open Patent Publication No. 1-189685/1989). A basic construction diagram of this kind of projection display apparatus is shown in FIGS. 3A-3B. In the figures, element 1 is a light source which generates divergent light, element 2 is a condenser lens for converting the divergent light from the light source into parallel rays; element 3' is a liquid crystal display device element 4 is a projection lens, and element 5 is a screen. In FIG. 3B there is shown a detailed view of the liquid crystal display device 3', which is constituted by a polarizer 6, a microlens array 7, a liquid crystal display element 8 and a polarizer 10. The microlens array 7 comprises the same microlenses arranged in a matrix form. The light incident on the liquid crystal display device 3' is first converted into linear polarized light by the polarizer 6, after which it is finely divided into each of the matrix-arranged pixels of the liquid crystal display element 8 with the microlens array 7, and then condensed to pass through the liquid crystal display element 8. The individual light rays are enlarged while being polarized by the liquid crystal display element 8, and only the light subjected to light modulation passes through the polarizer 10. The light emitted from the liquid crystal display device 3' is enlarged by the projection lens 4 and forms an image on the screen 5. According to this apparatus, the light once formed on the liquid crystal display element 8 is diverged to the projection lens 4, and again enlarged therefrom. Accordingly, when the liquid crystal display device and the projection lens are separated by more than a certain distance, there is a possibility for the signals of the adjacent pixels to be systematically mixed, which is systematically undesirable. Furthermore, in displaying the three basic colors of red, green and blue (R,G and B), the magnification rates thereof must be uniform. However, according to the abovementioned conventional system, it is difficult to do so.

SUMMARY OF THE INVENTION

An object of the present invention is to provide a liquid crystal projection display apparatus which has high allowance in the relative optical positions between the constituting elements, high optical source utilization effect, and large effective aperture rate.

According to the liquid crystal projection display apparatus of the present invention, approximately parallel rays emitted from the light source are separated and focused on the centers of the respective pixels with a first microlens array, the divergent light from the liquid crystal display element is converted into approximately parallel rays with a second microlens array, and enlarged by the projection lens.

According to the present invention, in comparison with the conventional system, by inserting a microlens array between the projection lens and the liquid crystal display element, the rays between the projection lens and the liquid crystal display element can be converted to approximately parallel rays, allowance can be provided with to the optical positional relationship, substantial light source utilization effect can be improved further than before, and the effective aperture ratio can be increased.

The microlens arrays may be fixed to or adjustably mounted on the liquid crystal display panel. As the first microlens array and the second microlens array can be separately attached to the liquid crystal display panel, there are four possible attaching methods, i.e., a method of adjustably mounting both the first and second microlens arrays, a method of fixing both the first and second microlens arrays, a method of adjustably mounting the first microlens array and fixing the second microlens array, and a method of adjustably mounting the second microlens array and fixing the first microlens array.

DESCRIPTION OP THE PREFERRED EMBODIMENTS

Figure 1A:
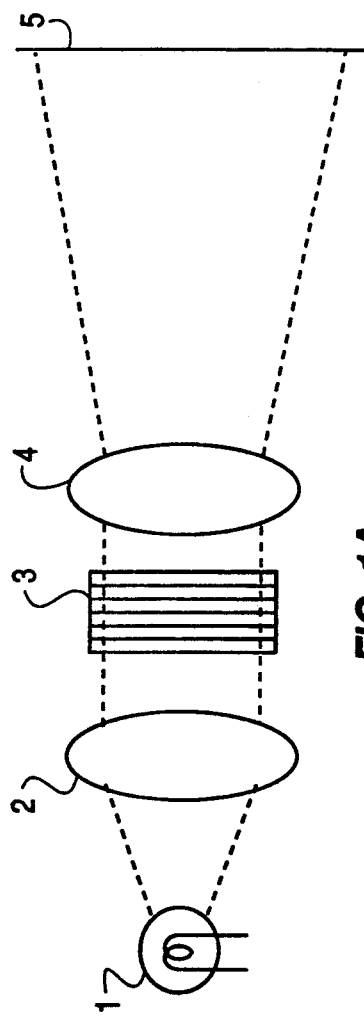
FIGS. 1A, 1B and 1C are schematic views of a projection display apparatus in accordance with an embodiment of the present invention.
Figure 1C:
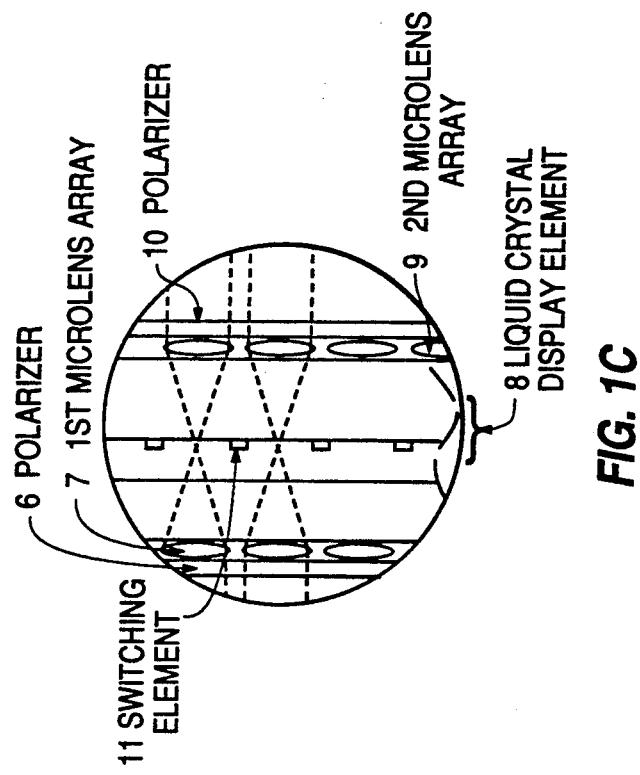
Figure 1B:
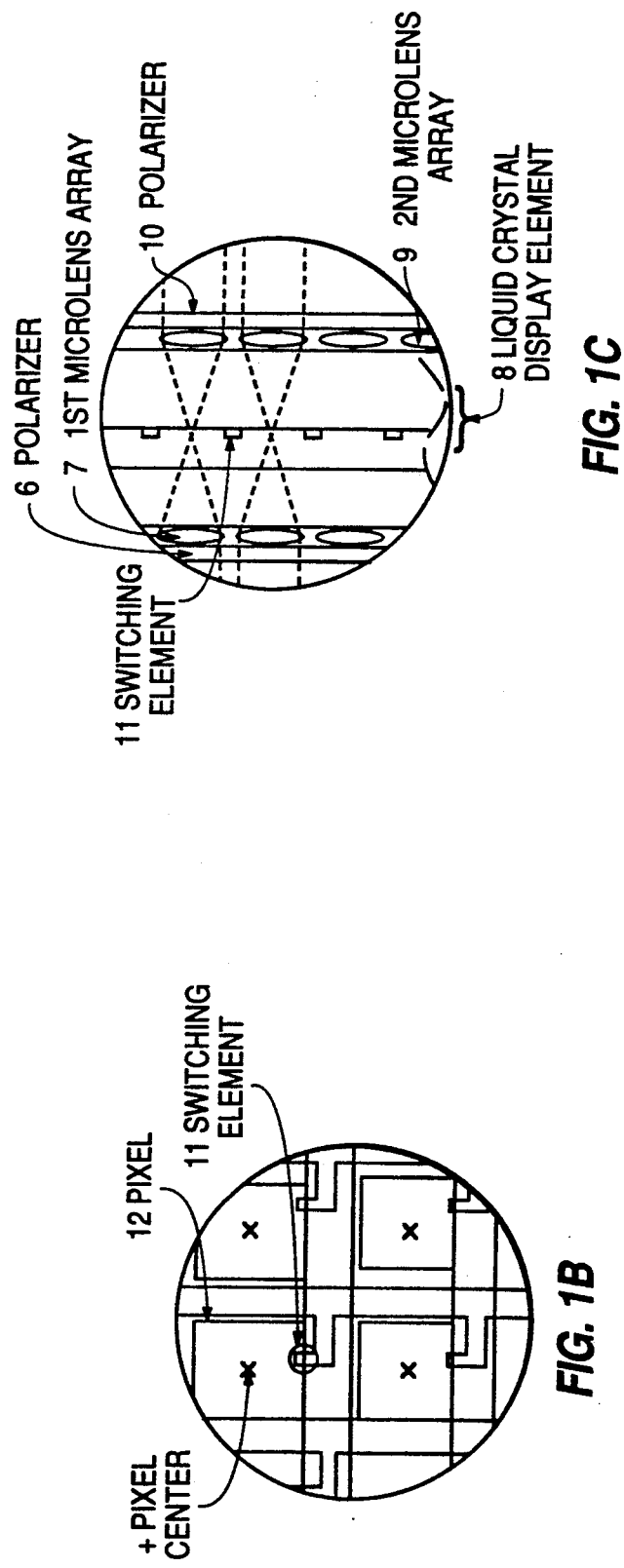

FIG. 1A shows a schematic view of a liquid crystal projection display apparatus in accordance with an embodiment of the present invention, in which element 1 is a light source for generating divergent light; element 2 is a condenser lens for converting the divergent rays from the light source 1 into parallel rays; element 3 is a liquid crystal display device; element 4 is a projection lens, and element 5 is a screen. FIG. 1B is a partial enlarged view of the liquid crystal display device 3, which is a plan view of the substrate having formed thereon switching elements 11 formed thereon. Element 11 is a switching element for transmitting a signal to a liquid crystal pixel electrode to cause optical modulation. The symbol + shows the center of the opening of each pixel. Element 12 is a pixel, which is constituted by a transparent electrode. FIG. 1C shows a partially enlarged section of the liquid crystal display device 3, which is constituted by a polarizer 6, a first microlens array 7, a liquid crystal display panel 8, a second microlens array 9, and a polarizer 10. The liquid crystal display panel 8 is so constituted that a liquid crystal is sandwiched between a substrate having switching elements 11 and pixel electrodes in a matrix form formed thereon and a substrate having a common electrode formed thereon. Each of the first and second microlens arrays 7 and 9 is formed by arranging the same microlenses having positive refractive power in a matrix form, so that the optical axes of the microlenses agree with the centers + of the openings of the corresponding pixels of the liquid crystal display panel 8. The light incident on the liquid crystal display device 3 is linearly polarized with the polarizer 6, after which it is finely divided into each of the matrix form pixels of the liquid crystal display panel 8, condensed and taken into the liquid crystal pixels. The light coming into the liquid crystal display panel 8 is once condensed, and then diverged from the vicinity of the center of the opening of the pixel 12, and, of the finely divided light, only the light subjected to optical modulation by the liquid crystal pixels pass through the polarizer 10. The divergent light which passed through the liquid crystal display panel 8 is converted to approximately parallel rays with the second microlens array, enlarged by the projection lens, and projected on the screen. The focal length of each microlens of the first and second microlens arrays 7 and 9 is designed to be a distance from the microlens face to the surface of the substrate including the switching elements 11 of the liquid crystal display panel 8 in, for example, the wavelength of green light (545 nm). The liquid crystal display panel 8 and the first and second microlens arrays 7 and 9 are attached in the following manner. With respect to the position setting, at the point of the agreement between the pixels at the four corners arranged in matrix form of the liquid crystal display panel 8 and the microlens at the four corners arranged in matrix form of the first microlens array 7, a transparent adhesive having a refractive index close to that of glass is poured into the liquid crystal display panel 8 and the first microlens array 7. In this case, reflections on the surfaces of the liquid crystal display panel 8 and the microlens can be reduced. Also, as the light coming from the light source is not cast into the region other than into the pixels 12, heat and light applied to the switching elements 11 can be avoided to the greatest possible extent, so that the liquid crystal display device has improved reliability and long life. The liquid crystal display panel 8 and the second microlens array 9 are also formed in the similar manner. The microlens array may be a plane microlens array or a Fresnel lens array.

Figure 2B:
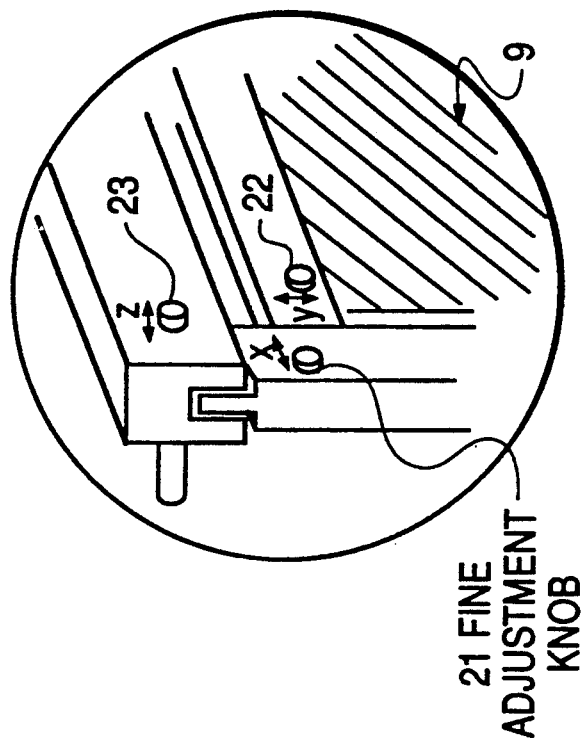
FIGS. 2A-2B are schematic views of a jig for adjustable mounting.
Figure 2A:
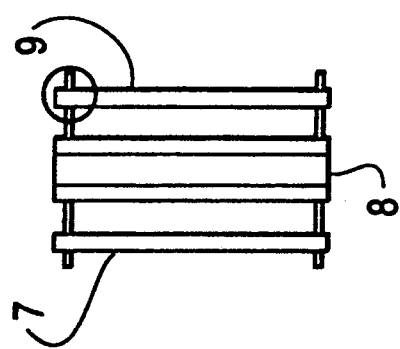
Figure 3A:
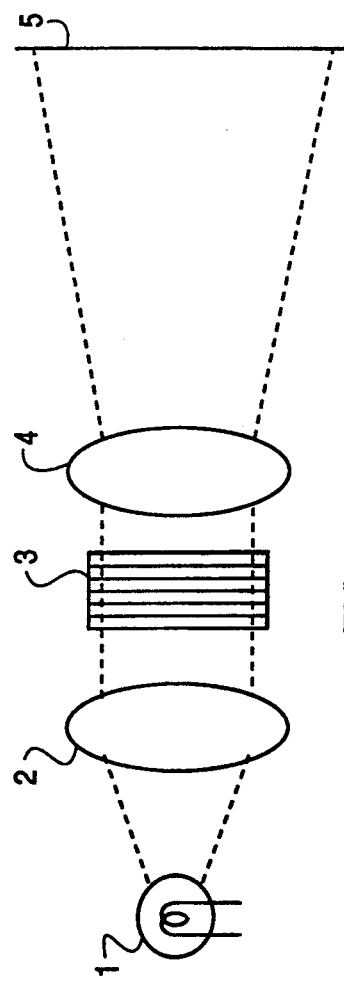
FIGS. 3A-3B are schematic views of the conventional projection display apparatus.
Figure 3B:
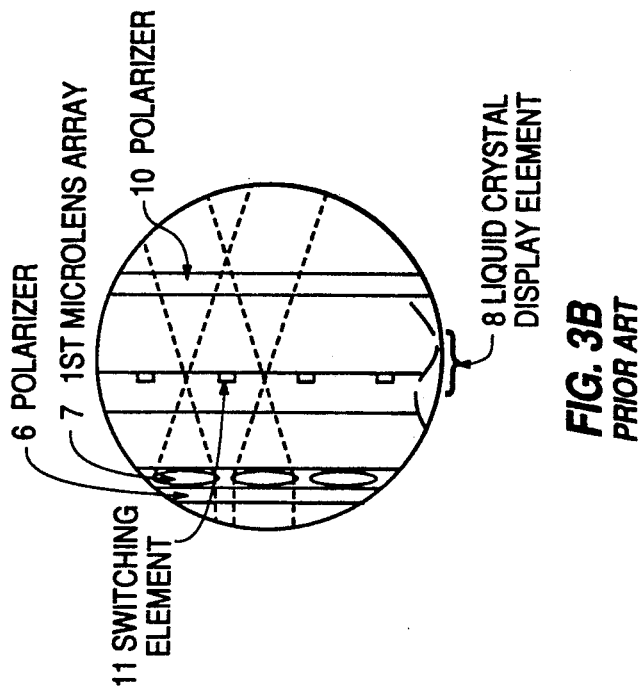

Although, in the present embodiment, the liquid crystal display panel and the microlens arrays are fixed together, the liquid crystal display panel 8 and the microlens arrays may not necessarily be fixed together but may be position-adjustably attached. FIGS. 2A–2B show an example of the case of attaching them without fixing together. In the figure, element 21 is a fine adjustment knob in the x co-ordinate direction; element 22 is a fine adjustment knob in the y co-ordinate direction, and element 23 is a fine adjustment knob in the z co-ordinate direction. In case of the adjustable attachment, unlike the case of the fixed attachment, corrections of x and y co-ordinates can be easily done with the fine adjustment knobs 21 and 22 in case of the dislocation of the position. However, unlike the case of fixed attachment, surface reflections may occur on the liquid crystal display panel 8 and the microlens, and the light amount may decrease. In the present embodiment, there is adopted the case where the liquid crystal display panel 8 and the first and second microlens arrays are both fixed, in which it is very difficult to have the liquid crystal display panel and the two lens systems agree, and it is only made possible to the do so to z co-ordinate by providing a fine adjustment knob 23. Expansion coefficients of the substrate of the liquid crystal display panel and the substrates forming the two microlens arrays must be equal. On the other hand, in the case where the liquid crystal display panel and the first and second microlens arrays 7 and 9 are both adjustably attached, in case of the dislocation of position, correction is easy and there is no necessity to pay attention to the kind of the substrate. However, surface reflections may occur on the liquid crystal display element and the microlens, and the light amount may decrease. Lastly, in the case where the liquid crystal display panel is fixedly attached to the first microlens array 7 and adjustably attached to the second microlens array 9, or where the liquid crystal display panel is adjustably attached to the first microlens array 7 and fixedly attached to the second microlens array 9, these assemblies possess merits and demerits of half those of the above-mentioned cases, respectively. The case where the liquid crystal display panel is adjustably attached to the first microlens array 7 and fixedly attached to the second microlens array 9 is systematically easy, and is considered to have better systematic effect than the case where the first and the second microlens arrays 7 and 9 are both fixedly attached. Further, with respect to the relationship of the liquid crystal display panel to the first microlens array 7, the precision of position setting is optically strict, and with the second microlens array 9, the precision of position setting is relatively mild, but it is not desired to reduce the light amount. An appropriate attachment method may be selected in consideration of the conditions for these two cases.

What is claimed is:

1. A liquid crystal projection display apparatus comprising:
   a liquid crystal display device having a liquid crystal display element on which pixels are formed in a matrix form;
   a first microlens array having microlens elements having a positive refractive index formed in a matrix and disposed in front of said liquid crystal display device for converging an incident light;
   a second microlens array having microlens elements having a positive refractive index formed in a matrix and disposed behind said liquid crystal display device for converting light which has passed through said liquid crystal display device into parallel light; and
   a projection lens for projecting the light from said second microlens array onto a screen;
   wherein said first and second microlens arrays are position-adjustably attached to said liquid crystal display device.

2. A liquid crystal projection display apparatus comprising:
   a liquid crystal display device having a liquid crystal display element on which pixels are formed in a matrix form;
   a first microlens array having microlens elements having a positive refractive index formed in a matrix and disposed in front of said liquid crystal display device for converging an incident light;
   a second microlens array having microlens elements having a positive refractive index formed in a matrix and disposed behind said liquid crystal display device for converting light which has passed through said liquid crystal display device into parallel light; and
   a projection lens for projecting the light from said second microlens array onto a screen;
   wherein one of said first and second microlens arrays is fixedly attached to said liquid crystal display device and the other of said first and second microlens arrays is position-adjustably attached to said liquid crystal display device.

* * * * *